United States Patent
Kegel et al.

(10) Patent No.: US 8,244,978 B2
(45) Date of Patent: Aug. 14, 2012

(54) IOMMU ARCHITECTED TLB SUPPORT

(75) Inventors: Andrew Kegel, Redmond, WA (US);
Mark Hummel, Franklin, MA (US);
Erich Boleyn, Portland, OR (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 302 days.

(21) Appl. No.: 12/707,341

(22) Filed: Feb. 17, 2010
(Under 37 CFR 1.47)

(65) Prior Publication Data
US 2011/0202724 A1 Aug. 18, 2011

(51) Int. Cl.
*G06F 12/00* (2006.01)
(52) U.S. Cl. .................... 711/118; 711/207
(58) Field of Classification Search .......... 711/118, 711/207
See application file for complete search history.

(56) References Cited

U.S. PATENT DOCUMENTS

| | | | | |
|---|---|---|---|---|
| 6,134,633 | A * | 10/2000 | Jacobs | 711/137 |
| 6,438,593 | B1 * | 8/2002 | Khanna et al. | 709/224 |
| 6,732,250 | B2 * | 5/2004 | Durrant | 711/202 |
| 2007/0136534 | A1 | 6/2007 | Mesard et al. | |
| 2008/0209130 | A1 * | 8/2008 | Kegel et al. | 711/135 |
| 2009/0119663 | A1 * | 5/2009 | Mukherjee et al. | 718/1 |
| 2010/0122062 | A1 * | 5/2010 | Hummel et al. | 711/205 |
| 2010/0191889 | A1 * | 7/2010 | Serebrin | 710/269 |

FOREIGN PATENT DOCUMENTS

EP 1 139 222 A1 10/2001

OTHER PUBLICATIONS

*AMD I/O Virtualization Technology (IOMMU) Specification License Agreement*, IOMMU Architectural Specification, pp. 1-90, Publication # 34434, Revision: 1.26, Advanced Micro Devices, Inc., Issue Date: Feb. 2009.

International Search Report and Written Opinion, dated Jun. 9, 2011, for PCT Appl. No. PCT/US2011/025075, filed Feb. 16, 2011, 11 pages.

Saulsbury, A. et al., "Recency-Based TLB Preloading," ACM, 2 Penn Plaza, Suite 701, New York, USA, pp. 117-127, XP040113215 (Jan. 1, 2000).

* cited by examiner

*Primary Examiner* — Hashem Farrokh
(74) *Attorney, Agent, or Firm* — Sterne, Kessler, Goldstein & Fox PLLC (57) ABSTRACT

Embodiments allow a smaller, simpler hardware implementation of an input/output memory management unit (IOMMU) having improved translation behavior that is independent of page table structures and formats. Embodiments also provide device-independent structures and methods of implementation, allowing greater generality of software (fewer specific software versions, in turn reducing development costs).

24 Claims, 12 Drawing Sheets

IOMMU ARCHITECTED TLB SUPPORT

BACKGROUND

1. Field of the Invention

The present invention is generally directed to computer systems, and more particularly, to input/output memory management units (IOMMUs).

2. Related Art

A memory management unit (MMU) can be associated with a central processing unit (CPU). For example, a CPU MMU is configured to translate virtual addresses used by the CPU into physical addresses corresponding to system memory, and the CPU MMU validates the access (present, read, write, etc.), allowing for memory over-commit, relocation, and protection in association with the CPU.

In systems relating to x86 CPUs, an Input/Output (IO) MMU associated with Input/Output peripherals has been defined relatively recently. An input/output memory management unit (IOMMU) can retrieve translation information from system memory responsive to peripheral requests associated with, e.g., virtual addresses used by the peripheral, to translate the virtual addresses to corresponding physical addresses of system memory.

The IOMMU typically can contain a page-table walker logic that inspects the contents of main system memory to find the necessary translation information (perform a page-table walk). For example, when a peripheral requests information that is not cached in the IOMMU (i.e., a "miss"), the page-table walker is used to obtain information from system memory. However, the page-table walker can be complex to implement, increasing the silicon area and power dissipation of the IOMMU chip or chip component. The IOMMU implements the page-table walker in an attempt to be locally optimal based on limited information available to the IOMMU hardware (e.g., affecting information cached in the IOMMU based on least-recently-used (LRU) algorithm). Such examples of hardware-only implementations can potentially lead to excessive translation fetches ("page-table walks") and excessive translation misses, degrading performance of the IO subsystem and leading to increased memory latency.

Additionally, the IOMMU typically is configured to read and parse information based on the format of page table entries associated with a particular architecture, limiting the IOMMU to a particular page table architecture, committing page table formats into hardware designs and, by implication, to a particular compatible processor implementation.

Software architected/managed translation look-aside buffer (TLB) caches are also known. Software manages a TLB and any page table walks are done in software. The software loads entries into the TLB, but no hardware infrastructure is backing the software architected TLB. Furthermore, software architected TLBs have inflexibility when it comes to loading and/or invalidation-when an entry is loaded into the TLB, the loader has the effect of replacing a previous entry.

Some IO controllers or peripherals contain simple MMUs that are managed by device driver software in the operating system or hypervisor. For example, a typical graphics controller contains a "local MMU" on the graphics card. In such a case, the "local MMU" mapping hardware is controlled by system software using sophisticated algorithms, but each MMU is unique and requires a unique driver. Changes to the peripheral hardware require changes to the driver, driving up development costs and lengthening development schedules, ultimately delaying time-to-market. This also means that a vendor cannot write a general driver for a hypervisor in a virtualized system and so specific drivers must be included within the hypervisor, the selection of which depends on the precise IO peripherals present in the system. This means that yet another driver must be written and tested for the hypervisor in addition to the drivers for the supported operating systems, again driving up development costs and time.

An approach is needed that improves IOMMU performance and provides a standardized interface enabling software to be written once for a hypervisor and used for multiple implementations of a peripheral memory mapping architecture.

BRIEF SUMMARY

Embodiments of the present invention allow a smaller, simpler hardware implementation of an IOMMU with improved translation behavior that is independent of page table structures and formats. Embodiments also provide device-independent structures and methods of implementation, allowing greater generality of software (fewer specific software versions, in turn reducing development costs).

One embodiment relates to a method including receiving a prefetch immediate command at an input/output (I/O) memory management unit (IOMMU) of a system. The prefetch immediate command specifies address translation information including (i) a virtual address and (ii) a translated physical address associated with the virtual address. The method further includes selectively storing, based on at least a resource status, the address translation information into an I/O translation look-aside buffer (IOTLB) associated with the IOMMU.

Another embodiment relates to a system including an input/output (I/O) memory management unit (IOMMU) configured to receive a prefetch immediate command. The prefetch immediate command specifies address translation information including (i) a virtual address and (ii) a translated physical address associated with the virtual address. An I/O translation look-aside buffer (IOTLB) associated with the IOMMU is configured to selectively store, based on at least a resource status, the address translation information.

Yet another embodiment relates to a tangible computer-readable medium having stored thereon, computer-executable instructions that, if executed by a computing device, causes the computing device to perform a method including receiving a prefetch immediate command at an input/output (I/O) memory management unit (IOMMU) of a system. The prefetch immediate command specifies address translation information including (i) a virtual address and (ii) a translated physical address associated with the virtual address. The method further includes selectively storing, based on at least a resource status, the address translation information into an I/O translation look-aside buffer (IOTLB) associated with the IOMMU.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and constitute part of the specification, illustrate embodiments and, together with the general description given above and the detailed description of the embodiments given below, serve to explain the principles of the embodiments of the present invention. In the drawings.

DETAILED DESCRIPTION

An embodiment of the present invention provides a memory management unit, and applications thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
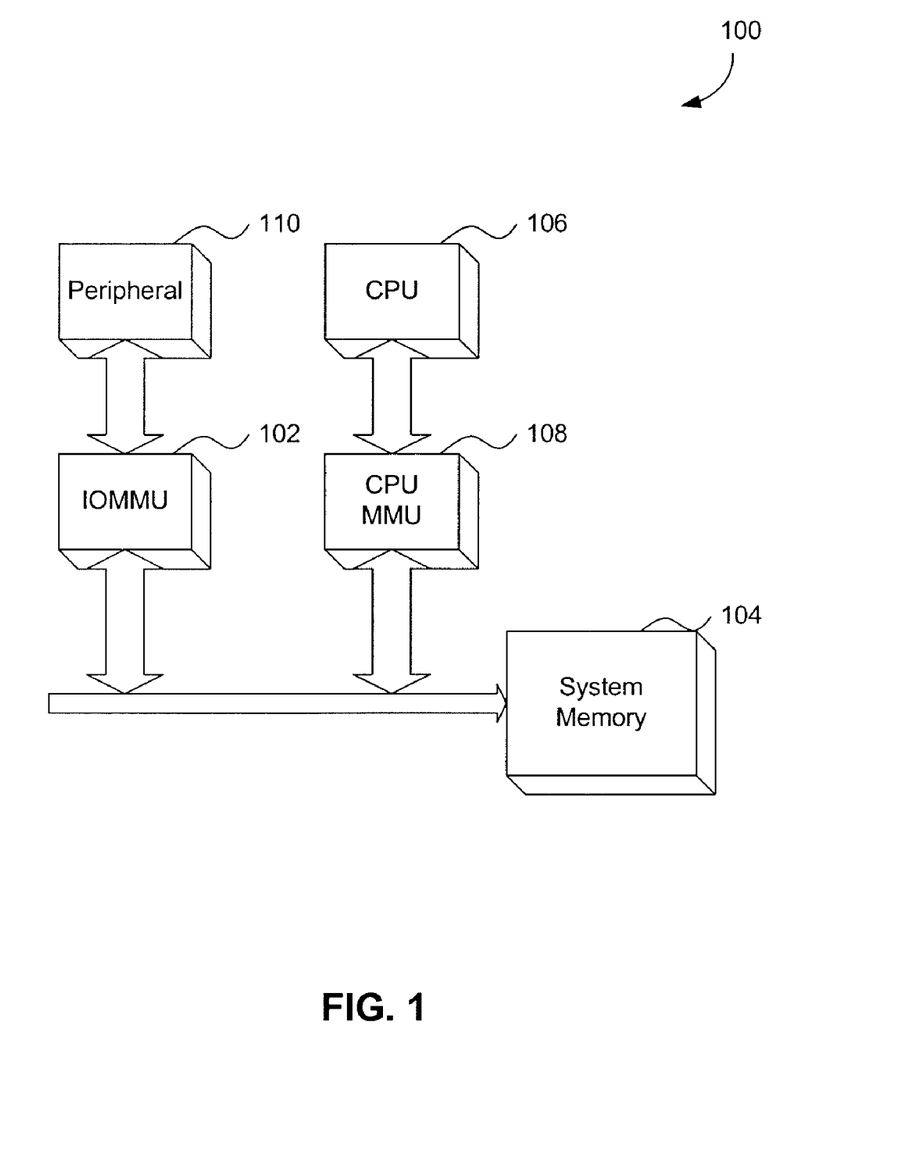
FIG. 1 is a block diagram illustrating a system including an IOMMU in accordance with an embodiment.

FIG. 1 is a block diagram illustration of a system 100 including CPU 106 and CPU MMU 108 associated with CPU 106. System 100 further includes an IOMMU 102 associated with peripheral 110. Although not illustrated here, multiple IOMMUs are contemplated in system 100, just as multiple CPU MMUs 108 are contemplated (e.g., multiprocessor systems).

The IOMMU 102 operates in accordance with a set of defined functions and behaviors. These functions and behaviors are associated with a set of commands that are queued in system memory 104 and read by the IOMMU 102 to be performed/consumed by the IOMMU 102.

The IOMMU 102 translates virtual/physical addresses between the peripheral 110 and the system memory 104 and performs interrupt remapping. Interrupt remapping functions similar to address translation in that it translates addresses corresponding to remapping interrupts. For improving translation/remapping speeds of the IOMMU 102, address translation/interrupt remapping information stored in system memory 104 can be cached in the IOMMU 102. This process increases the speed at which the IOMMU 102 can access the translation or remapping information.

Figure 2:
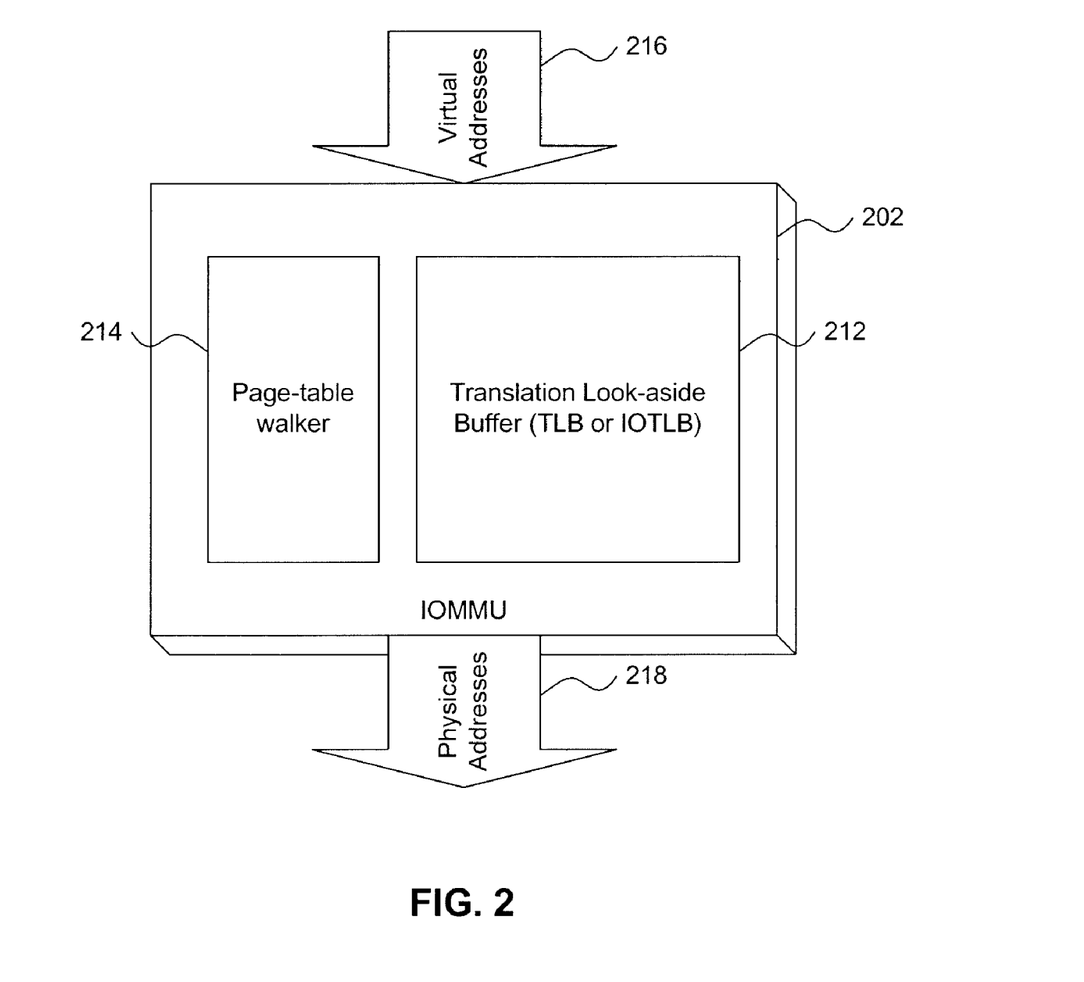
FIG. 2 is a block diagram illustrating an IOMMU in accordance with another embodiment.

FIG. 2 is a more detailed block diagram illustration of the IOMMU 102 of FIG. 1. The IOMMU 202 includes a page-table walker 214 configured to inspect the contents of main system memory 104 (see FIG. 1). The page-table walker 214 also facilitates location and retrieval of information for storage/caching in the IOMMU 102. The page-table walker 214 can insert translation information into a cache referred to as a translation look-aside buffer (TLB) 212, also known as an input/output TLB (IOTLB) 212. The IOTLB 212 can be used for address translations between virtual addresses 216 and physical addresses 218. Similar caching structures can be used for interrupt remapping.

The IOMMU 102 reads commands from system memory 104 that control the filling of information to be cached, and the invalidation or flushing of translation/remapping information that is cached in the IOMMU 102 and/or IOTLB 212. The IOMMU 102 is further capable of automatically loading translation/remapping information from the system memory 104, responsive to requests for the information from peripheral 110. For example, the IOMMU 102 can implement a hardware page-table walker 214 to perform a page-table walk and retrieve physical addresses 218 from page tables of system memory 104. The page-table walk can be responsive to requests from peripheral 110 including virtual addresses 216, when the virtual addresses 216 to be translated are not cached in IOTLB 212.

Address translation/remapping information in the IOTLB 212 can be maintained and updated in various ways (also referred to as translation buffer policy) via hardware and/or software. For example, the system software on the CPU 106 can invalidate cached information in the IOMMU 102 that is no longer valid because of changes in corresponding information stored in system memory 104. The IOMMU 102 can also implement translation buffer policy in hardware, such that hardware primarily decides caching and eviction of translation entries cached in the IOMMU 102. A cached translation entry can be evicted to make room for new information. A cached translation entry must be flushed when it is no longer valid. These and other techniques can be applied in dealing with information in the IOTLB 212 when it is to be replaced or is no longer valid.

The IOMMU 102 can prefetch information from system memory 104, prior to receiving a request for that information from a peripheral 110. A prefetch command can be implemented, for example, as disclosed in U.S. patent application Ser. No. 12/112,611, filed Apr. 30, 2008 and entitled "Translation Data Prefetch in an IOMMU," the contents of which are hereby incorporated by reference in full. A prefetch command can instruct IOMMU 102 to walk page tables of the system memory 104 and preload translation information associated with, for example, a specified (device virtual) address. Accordingly, the preloaded translation information is available in the IOTLB 212 when a request comes in to the IOMMU 102

Figure 3:
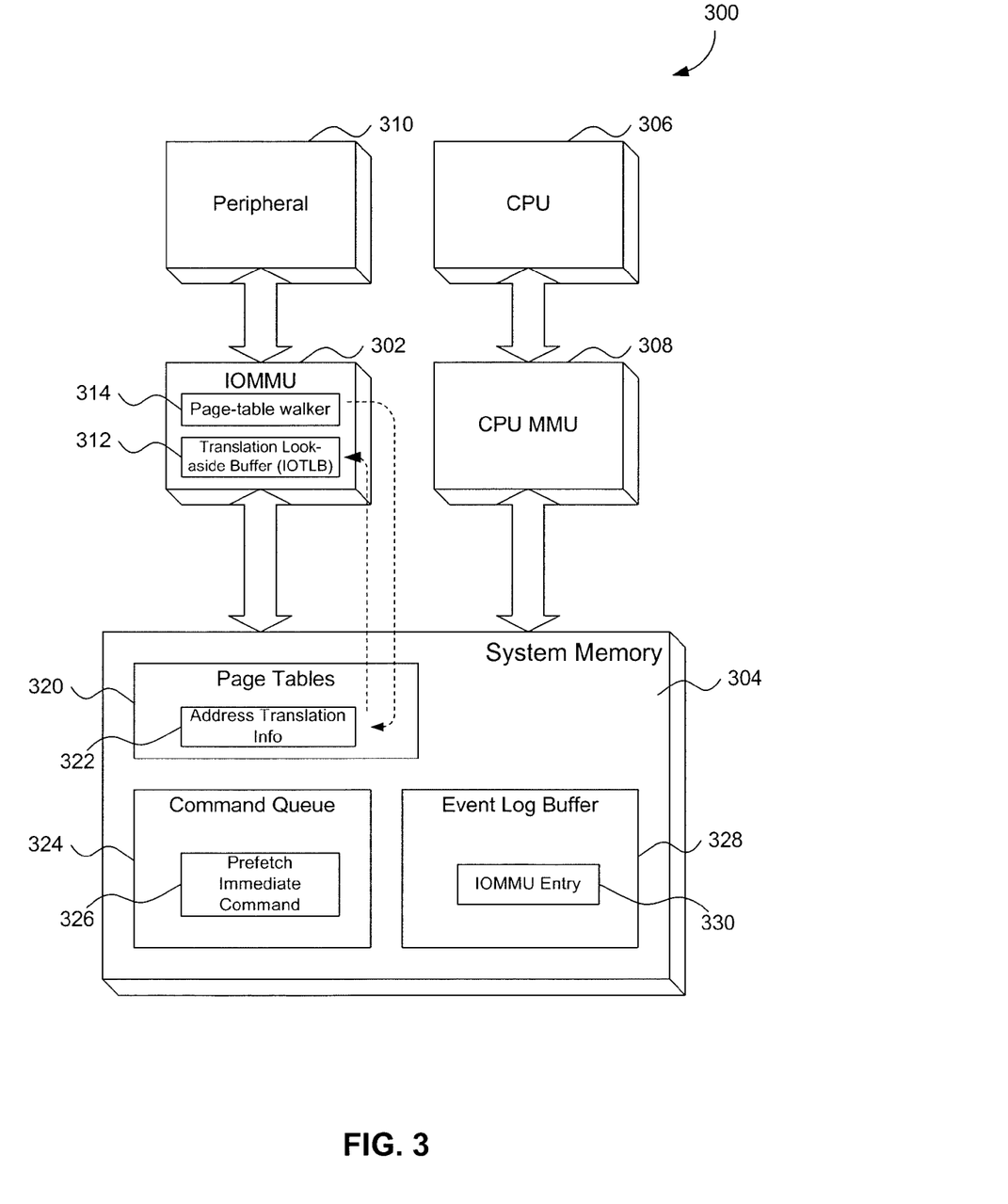
FIG. 3 is a block diagram illustrating a system including an IOMMU interacting with system memory in accordance with another embodiment.

FIG. 3 is a block diagram illustration of a system 300, including an IOMMU 302 and system memory 304. System 300 further includes page tables 320 and event log buffer 328.

Address translation information 322 is accessible in the page tables 320. An IOMMU entry 330 is accessible in the event log buffer 328. System 300 can additionally include CPU 306 and CPU MMU 308.

Regarding filling the IOMMU cache(s), the IOMMU 302 accesses and caches address translation information 322 stored in the page tables 320 of system memory 304. As illustrated, page-table walker 314 of the IOMMU 302 performs a page-table walk to retrieve the address translation information 322. The address translation information 322 is then cached in the IOTLB 312. When a subsequent request from peripheral 310 arrives at the IOMMU 302 for the address translation information 322, the address translation information 322 is available in the IOTLB 312 such that a page-table walk is not necessary. If a request arrives at the IOMMU 302 for address translation information 322 that is no longer available at the IOTLB 312, then a subsequent page-table walk can be performed to obtain the address translation information 322 from the page tables 320. Alternatively, the system 300 can utilize a prefetch immediate command 326 to update contents of the IOTLB 312.

The IOMMU 302 can read and consume commands stored in the command queue 324 of the system memory 304. The IOMMU 302 can thereby fill its cache(s) using information passed in the commands. In addition to fill policies, commands read by the IOMMU 302 can, in effect, allow system software to invalidate or otherwise update information cached in the IOTLB 312. For example, invalidation can be associated with a condition when the address translation information 322 changes, such that the previously cached address translation information in the IOTLB 312 no longer corresponds with the changed address translation information 322.

Commands read from the command queue 324 by the IOMMU 302 can further augment functions of the IOMMU 302. A prefetch immediate command 326 can contain the address translation information 322 within the body of the prefetch immediate command 326. The IOMMU 302 can then receive address translation information 322 via the prefetch immediate command 326. Accordingly, the IOMMU 302 does not need to use the page-table walker 314 to walk the page tables 320 to obtain the address translation information 322. The information in the prefetch immediate command 326 can be loaded directly into the target IOTLB 312 without performing any page-table walking. As illustrated, page-table walker 314 is available to back-up and/or work in conjunction with the prefetch immediate command 326.

Prefetch immediate command 326 can be implemented as a new command to the IOMMU, or as a variation of the prefetch command described above. It can also be implemented as a set of MMIO registers to which system software writes the necessary information.

Figure 4:
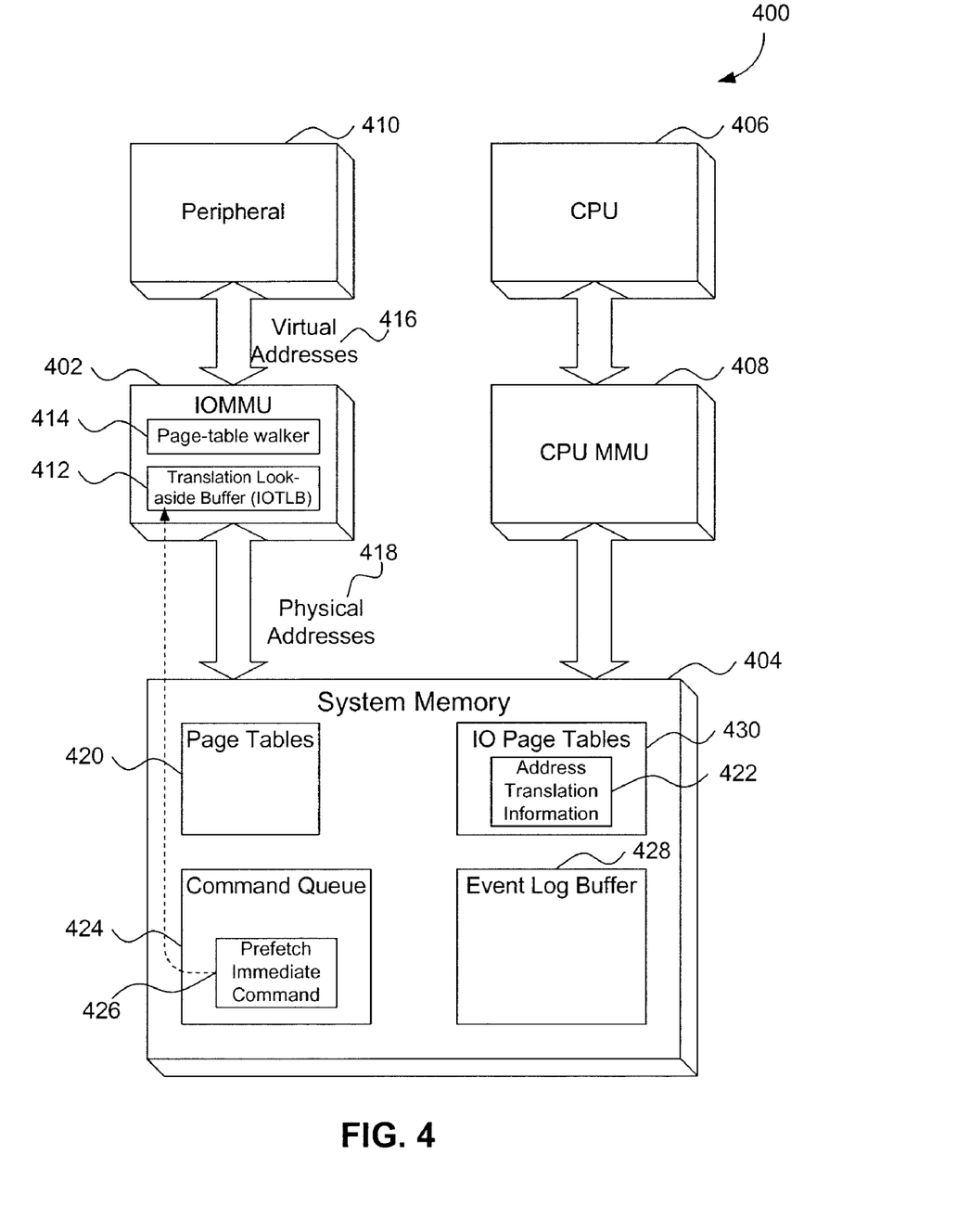
FIG. 4 is a block diagram illustrating a system including an IOMMU interacting with system memory in accordance with another embodiment.

FIG. 4 is a block diagram illustration of a system 400 implementing a prefetch immediate command 426 in accordance with the present embodiments. System 400 is associated with a peripheral 410, and can include a CPU 406, CPU MMU 408, and system memory 404. System memory 404 includes page tables 420, command queue 424, and event log buffer 428. System memory 404 also can be associated with IO page tables 430. Address translation information 422 can be stored in IO page tables 430. The internal format of IO Page Tables 430 need not be the same as the internal format of Page Tables 420. Prefetch immediate command 426 caches address translation information 422 into the IOTLB 412. The address translation information 422 is associated with the virtual addresses 416 and the physical addresses 418. The system 400 can manage the command queue 424 and the prefetch immediate command 426 to provide the address translation information 422 for use by the prefetch immediate command 426. Accordingly, the system 400 interacting with the IOMMU using the prefetch immediate command 426, introduces flexibility and opportunities for the system 400 to be associated with the caching of data in the IOMMU 402.

Additionally, the system 400 can achieve caching of address translation information 422 at the IOTLB 412, without requiring the use of the page-table walker 414. Thus, the system 400 is not required to contain specific system drivers to interface with a specific hardware implemented page-table walker 414 (if utilized). However, it is contemplated that the prefetch immediate command 426 can work in conjunction with a hardware page-table walker 414 to improve overall performance, if applicable.

Figure 5:
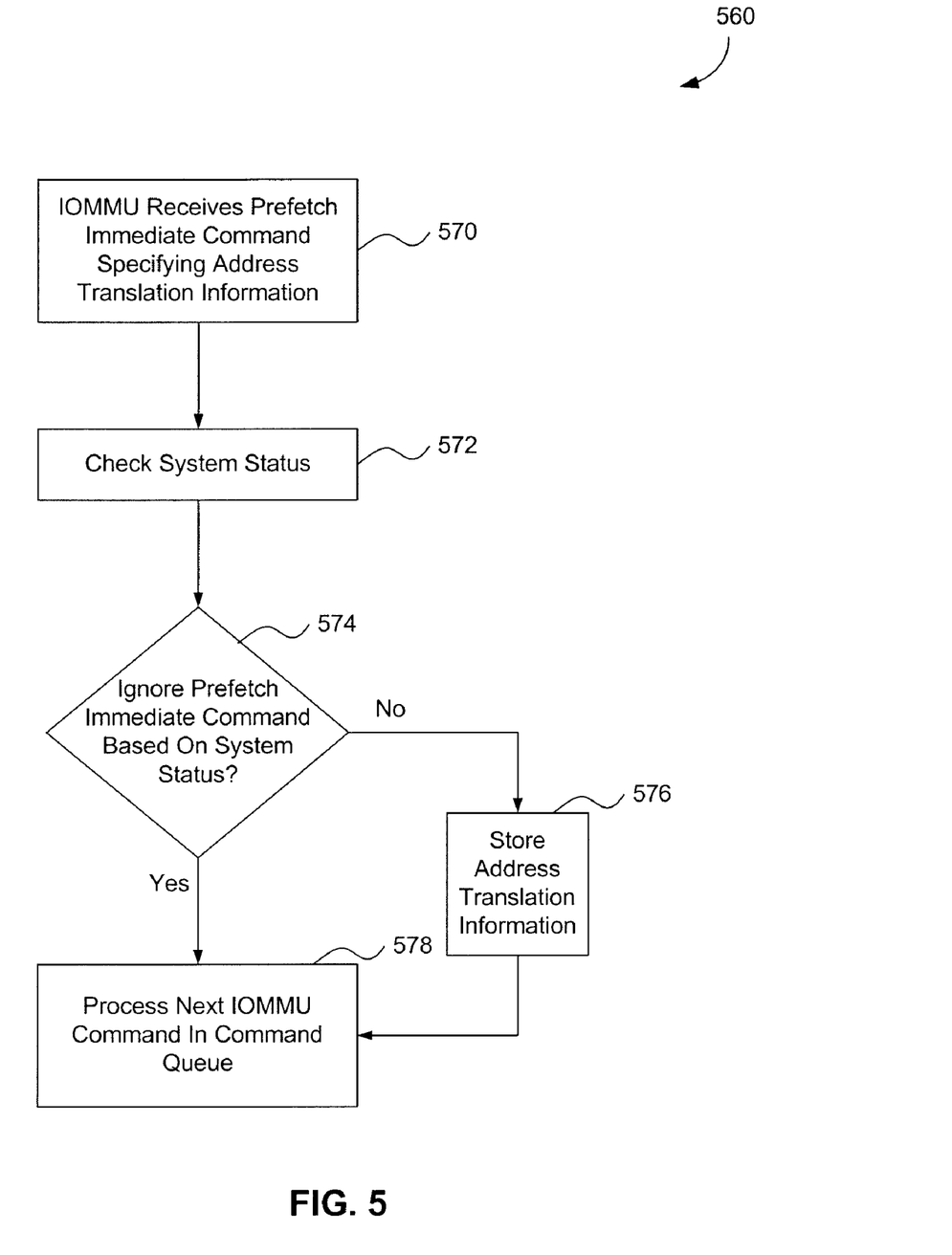
FIG. 5 is a flow diagram illustrating a method for selectively storing address translation information in accordance with another embodiment.

FIG. 5 is a flowchart illustration of an exemplary method 560 of selectively storing address translation information based on the system status, in accordance with the present embodiments. In step 570, the IOMMU receives a prefetch immediate command specifying address translation information. In step 572, a system status is checked, for example by the IOMMU or the system. The system status can include a resource status of the system, which can include an availability of system resources, an availability of one or more vacant address entries in the IOTLB, a power-conserving and/or sleep status, and/or an availability of system resources in view of outstanding system requests. The resource status can also include a priority of one or more valid address entries stored in the IOTLB corresponding to the address translation information specified in the prefetch immediate command, or an invalidation indication specified in the prefetch immediate command.

In step 574, a decision is made whether to ignore the prefetch immediate command based on the system status. If the decision is not to ignore the prefetch immediate command, the method proceeds to step 576, and the address translation information is stored at the IOTLB of the IOMMU. The method then proceeds from step 576 to step 578. If the decision is to ignore the prefetch immediate command at step 574, the method proceeds to step 578 and the next IOMMU command in the command queue is processed.

The command format for the prefetch immediate command can contain the translated physical address and other information including permission access indicators and IOMMU Domain information for the specified (device virtual) address. The command format may also contain the IOTLB slot destination.

The IOMMU can selectively ignore the prefetch immediate command. For example, the IOMMU can decide that an existing entry in the IOMMU caches should not be overwritten, and that there is not a currently available IOMMU cache entry where the address translation should be inserted. When a request later arrives at the IOMMU for the address translation information that was contained in the ignored prefetch immediate command but not inserted, the IOMMU can perform a page-table walk or request a prefetch immediate command to obtain the requested address translation information. If, for some reason, it would be inconvenient or not the right time to honor a prefetch immediate command, it is safe for the prefetch immediate command to be ignored.

The selective honoring/ignoring of the prefetch immediate command enables the IOMMU to optimize system performance by considering resource status in deciding whether to honor the command. Hardware-based infrastructure/mechanisms for obtaining and inserting address translation information are available to embodiments of the IOMMU, and the prefetch immediate command is an acceleration on top of the hardware infrastructure. The prefetch immediate command can load the address translation information, or the command can be ignored and the hardware mechanism can be relied upon to load the address translation information.

The prefetch immediate command provides an alternative to the page-table walker of the IOMMU for providing address translation information to the IOMMU. Additionally, various techniques can be implemented for loading and/or inserting the provided address translation information into the IOTLB of the IOMMU. Embodiments described herein can work in conjunction with existing functionality of the IOMMU, or override the IOMMU functionality.

In one embodiment, the IOMMU's native cache replacement algorithm can be used to insert the provided address translation information into the IOMMU's IOTLB, i.e., into the IOMMU's internal address translation cache. In this way, the IOMMU IOTLB translation cache would function normally when loading/inserting the provided address translation information into the IOTLB. However, the IOMMU overall would not need the page-walk function to obtain and/or provide the address translation information to the IOMMU's native cache replacement algorithm.

Accordingly, the native cache replacement algorithm of the IOMMU can handle situations that can result in eviction, e.g., when there is not a free slot in the IOTLB to store the provided address translation information. For example, the normal operation of the IOTLB may cause address translation information already cached in the IOTLB to be evicted (replaced) by other provided address translation information, even before the already cached address translation information is used or requested.

In another embodiment, the prefetch immediate command can contain information directing the IOMMU to load the information into a specific slot in the IOMMU IOTLB translation cache. The loading of this information overrides or replaces the IOMMU translation cache replacement hardware and/or algorithm for that prefetch immediate command. The normal operation of the IOTLB subsequently may cause the translation information to be evicted (replaced) before it is used. Because the system can direct the IOMMU, the system is freed from the specifics of the IOMMU translation cache replacement hardware and/or algorithm.

In yet another embodiment, the IOTLB structure is exposed directly in, for example, MMIO space where system software can directly manipulate the contents, or indirectly in MMIO space through an address/data register pair.

Figure 6:
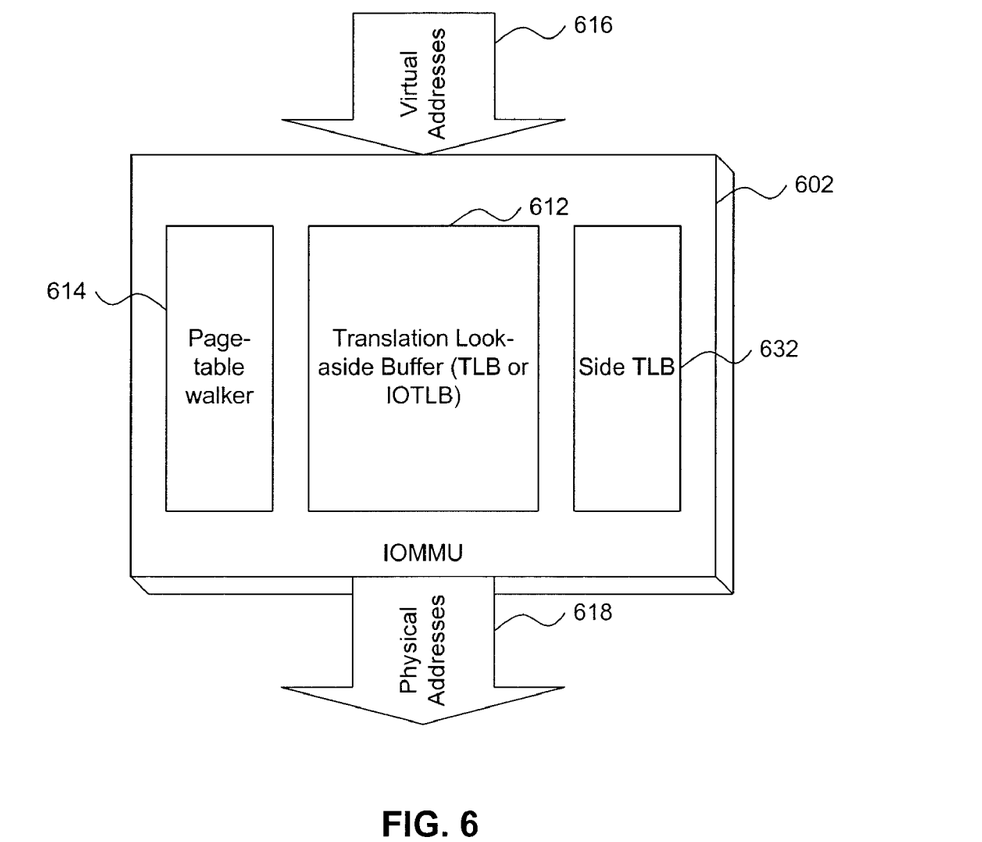
FIG. 6 is a block diagram illustrating an IOMMU in accordance with another embodiment.

FIG. 6 is a block diagram illustration of another embodiment of an IOMMU 602 including side TLB 632, in accordance with the present embodiments. IOMMU 602 is associated with virtual addresses 616, physical addresses 618, and page-table walker 614. The side TLB 632 is separated from the IOTLB 612. The IOMMU 602 can insert the provided address translation information into special "side" translation look-aside buffers (side TLB 632). The side TLB 632 can be managed by the system software and can contain frequently used translations. Keeping the frequently used translations aside from the IOTLB 612 by using side TLB 632 frees the frequently used translations from competing with other address translations for slots in the IOTLB 612. The frequently used translations cached in the side TLB 632 would not be evicted by normal translation cache operation of the IOMMU 602 performed on IOTLB 612, making the side TLB 632 "sticky" and always available for storing address translation information. For example, device direct memory access (DMA) operations that need address translation information stored in the entries of the side TLB cache would be translated quickly and would not be delayed by page walks by the IOMMU.

Figure 7:
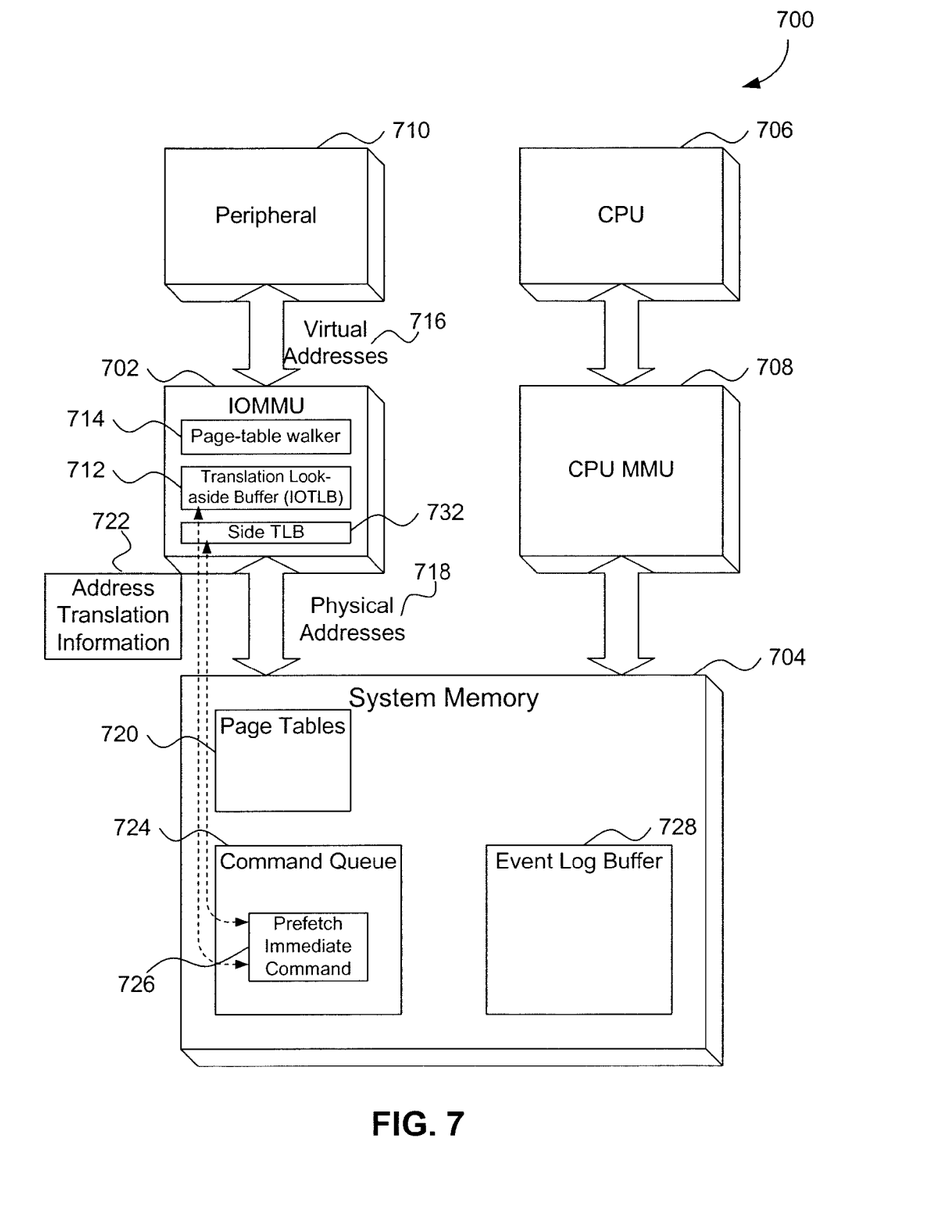
FIG. 7 is a block diagram illustrating a system including an IOMMU interacting with system memory in accordance with yet another embodiment.

FIG. 7 is a block diagram illustration of a system 700 with IOMMU 702 including IOTLB 712 and side TLB 732 in accordance with the present embodiments. System 700 includes CPU 706, CPU MMU 708, and system memory 704. System memory 704 includes page tables 720, command queue 724, and event log buffer 728. In the system 700, a request from peripheral 710 including virtual addresses 716 arrives at IOMMU 702. IOMMU 702 determines whether address translation information associated with physical addresses 718 and corresponding to the virtual addresses 716 is cached at the IOMMU 702 in the IOTLB 712 and/or the side TLB 732. If the information is not available at the IOMMU 702, and is available from page tables 720 of main system memory 704, there is an IOTLB miss (distinct from a page fault, where the information is not available). The page-table walker 714 is available to access the page tables 720 of system memory 704 to obtain and provide the address translation information needed to serve the request at the IOMMU 702. Additionally, system 700 can use the command queue 724 to execute a prefetch immediate command 726 to provide address translation information 722 for the side TLB 732 and the IOTLB 712, without waiting for the page-table walker 714 to perform a page-table walk.

The IOMMU 702 can be configured to provide information to system software and/or system 700 about the size and functionality of the storage (cache; e.g., IOTLB 712 and side TLB 732) associated with the prefetch immediate command 726 so that system software can optimize use of the storage cache. The provided information can include, for example, the number and type of entries and their organization as a cache. Accordingly, the system 700 can intelligently manage the storage cache resources of the IOMMU 702 at a global system level.

Figure 8:
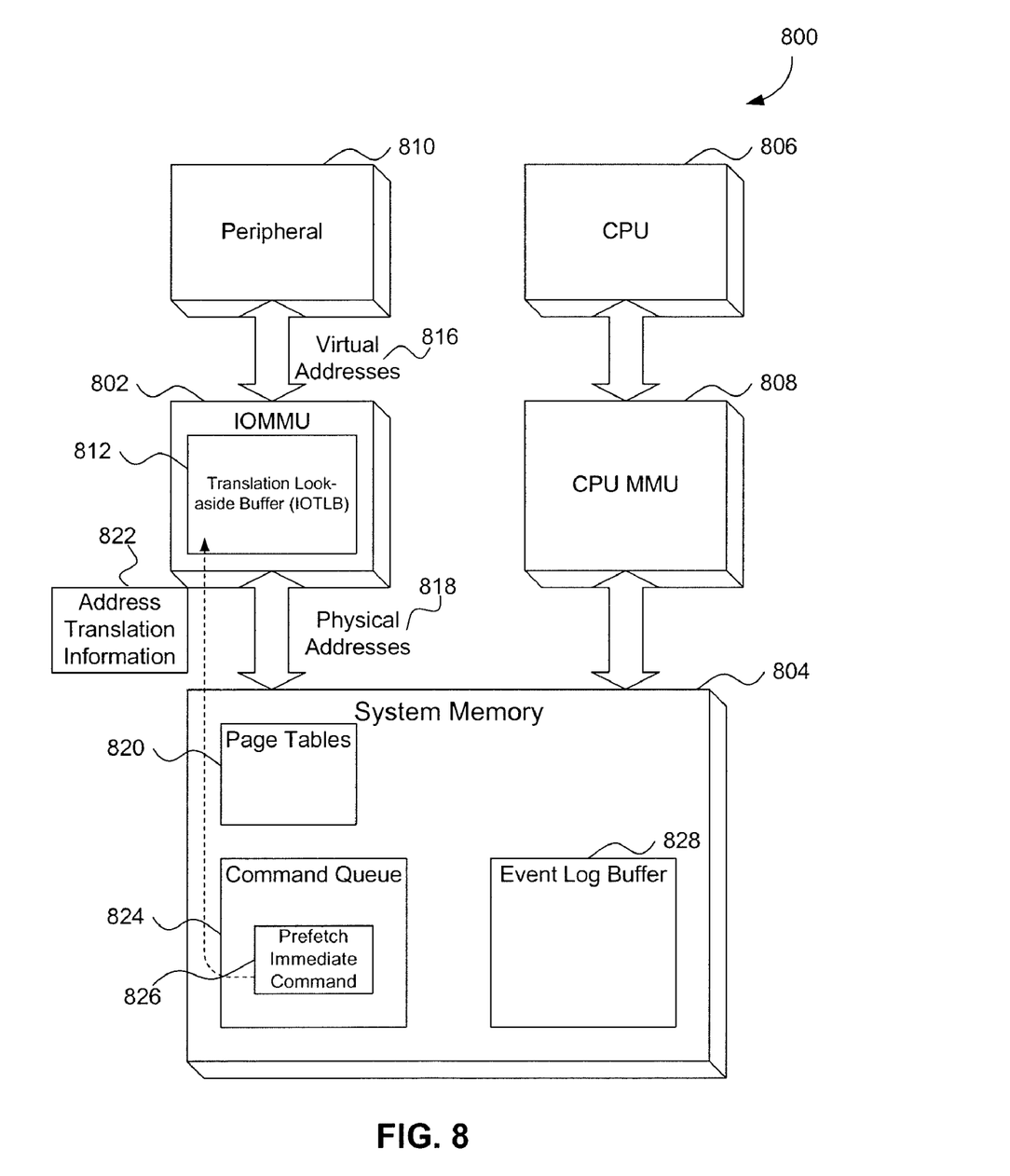
FIG. 8 is a block diagram illustrating a system including an IOMMU interacting with system memory in accordance with yet another embodiment.

FIG. 8 is a block diagram illustration of a system 800 with IOMMU 802 including IOTLB 812 in accordance with the present embodiments. System 800 includes system memory 804 and CPU MMU 808. System memory 804 includes page tables 820, command queue 824, and event log buffer 828. In the embodiment of FIG. 8, the IOMMU 802 does not include a page table walker, thus conserving power and chip real-estate. A request from peripheral 810 including virtual addresses 816 arrives at the IOMMU 802. The IOMMU 802 determines whether address translation information associated with the virtual addresses 816 and physical addresses 818 is available at the IOMMU 802 to service the translation request from the peripheral 810. When address translation information is not cached at the IOMMU 802 (e.g., an IOTLB miss), the IOMMU 802 creates a new IOMMU event log entry at the event log buffer 828. The event log entry signals the main CPU 806 that translation information is required by the IOMMU 802. The main CPU 806 can use the prefetch immediate command 826 to insert the address translation information 822 into the IOTLB 812 and resume the IO operation of the peripheral 810 that triggered the event. A side TLB (not illustrated in FIG. 8; see, e.g., FIG. 7) can be included in IOMMU 802 to further reduce or eliminate the probability of an IOTLB miss, depending on implementation decisions and usage patterns of the IOMMU 802 cache.

The prefetch immediate command can contain the domain information (the Device Table Entry contents) in order to inject the domain information into the IOMMU cache structure. Alternatively, injecting the domain information can be implemented as a separate command, depending on various implementation specifics.

Figure 9:
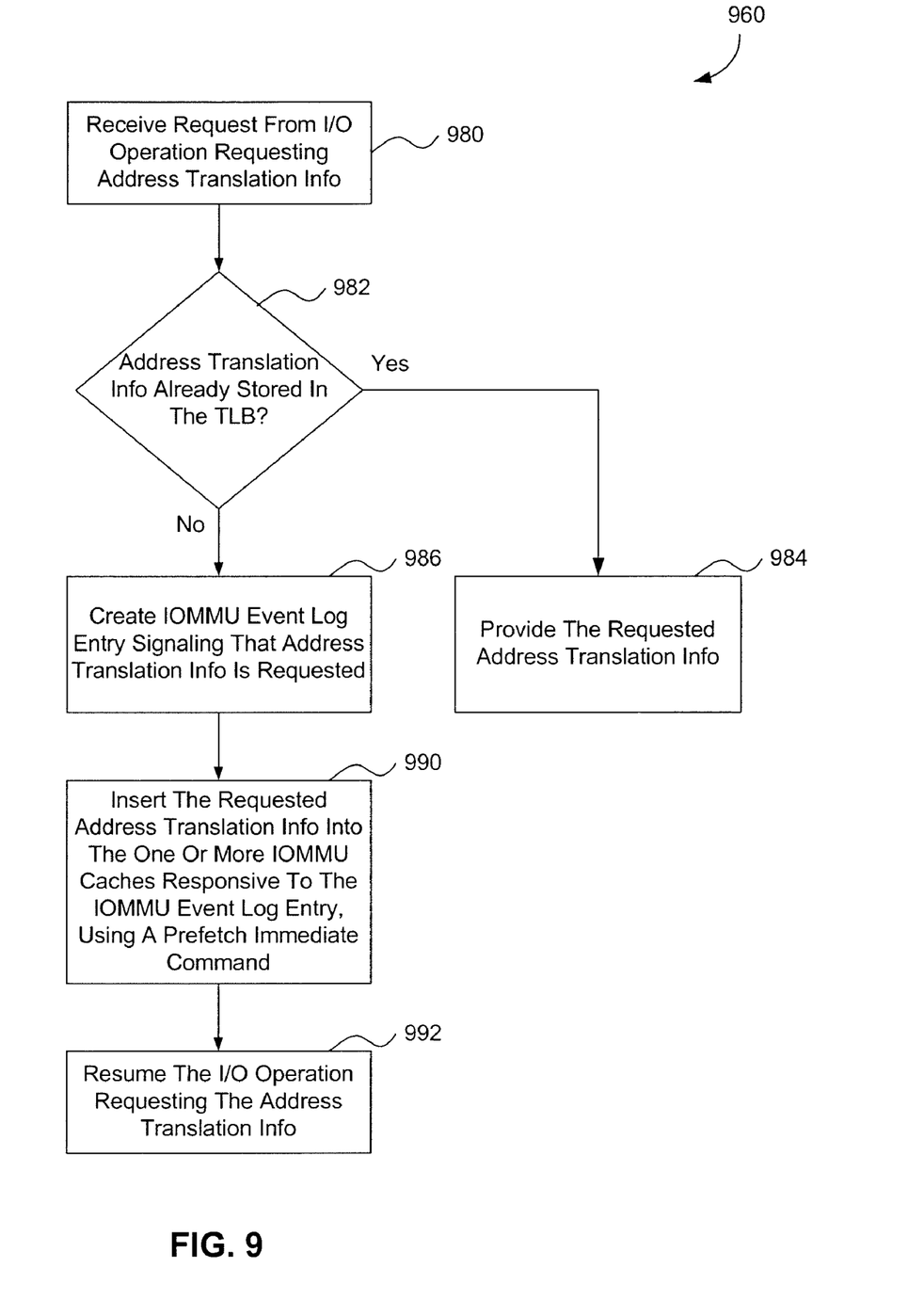
FIG. 9 is a flow diagram illustrating a method for servicing a request for address translation data in accordance with yet another embodiment.

FIG. 9 is a flowchart illustration of an exemplary method 960 for servicing a request from an I/O operation. In step 980, a request is received from an I/O operation requesting address translation information. In step 982, it is determined whether address translation information associated with the request is already stored in the IOTLB of the IOMMU. If the address translation information is already stored, the method proceeds to step 984 and the requested address translation information is provided. If, at step 982, the address translation information is not already stored, the method proceeds to step 986 and an IOMMU event log entry is created, signaling that address translation information is requested. In step 990, the requested address translation information is inserted into the one or more IOMMU caches responsive to the IOMMU event log entry, using a prefetch immediate command. In step 992, the I/O operation requesting the address translation information is resumed.

Figure 10:
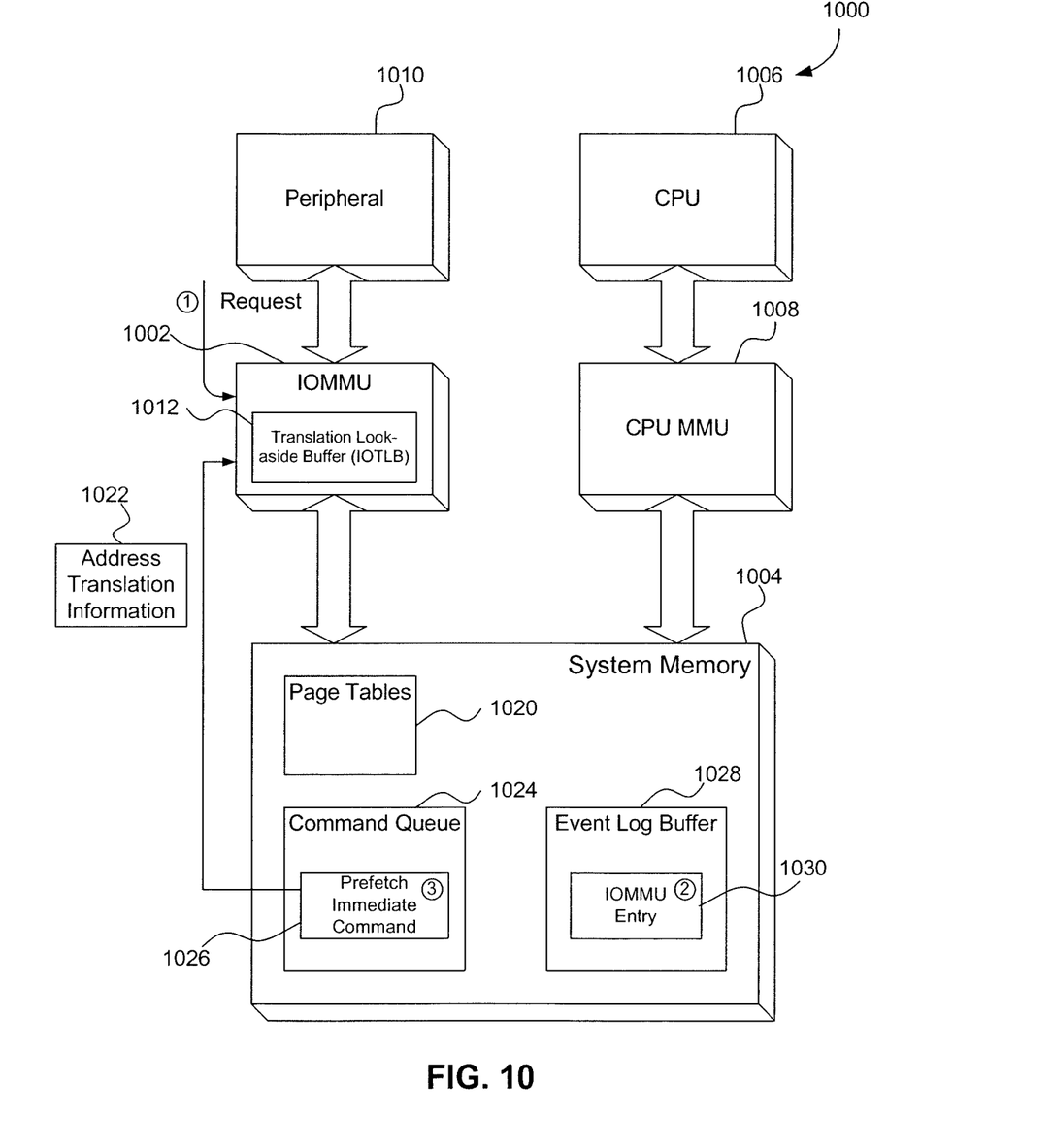
FIG. 10 is a block diagram illustrating a system including an IOMMU interacting with system memory in accordance with yet another embodiment.

FIG. 10 is a block diagram illustration of a system 1000 with an event log buffer 1028 including IOMMU event log entry 1030. The illustrated embodiment does not include a page table walker in the IOMMU 1002, thus conserving power and chip real-estate. System 1000 includes CPU MMU 1008 and system memory 1004. System memory 1004 includes page tables 1020, command queue 1024, and event log buffer 1028. In the system 1000, a request from peripheral 1010 arrives at the IOMMU 1002. The IOMMU 1002 determines whether address translation information is available at the IOMMU 1002 to service the translation request from the peripheral 1010. In the event that address translation information is not cached at the IOMMU 1002 (e.g., an IOTLB miss), a new IOMMU event log entry 1030 is created at the event log buffer 1028. The IOMMU entry 1030 signals the main CPU 1006 that translation information is requested by the IOMMU 1002. The main CPU 1006 uses prefetch immediate command 1026 to provide the address translation information 1022 to the IOTLB 1012. The translation information 1022 is provided by putting the prefetch immediate command 1026 into the command queue 1024 of system memory 1004. The IOMMU 1002 fetches the prefetch immediate command 1026 from the command queue 1024, and the IOMMU 1002 executes the prefetch immediate command 1026. The provided address translation information 1022 can then be inserted into the IOTLB 1012 using various fill policies described above.

For example, the prefetch immediate command 1026 can include specific slot or other information regarding a specific location of the IOTLB 1012. Alternatively, the native cache replacement algorithm of the IOMMU can be used to insert the provided address translation information 1022 into the IOTLB 1012. A side TLB (not illustrated) can be included in IOMMU 1002 to further reduce or eliminate the probability of an IOTLB miss, depending on implementation decisions and usage patterns of the IOMMU 1002 cache.

Address translation information can be invalidated and/or removed from the translation cache(s) of the IOMMU for various reasons. For example, the address translation information cached in the IOMMU may no longer correspond to the address translation information stored in page tables of system memory.

In an embodiment, an INVALIDATE IOMMU PAGES command can be used to specify address translation information or a particular address to invalidate, such that the IOMMU searches its internal address translation cache(s) using a native IOMMU search algorithm to find any particular entry or entries to invalidate.

In another embodiment, the INVALIDATE_JOMMU_PAGES command can indicate a specific slot of the IOMMU to invalidate, instead of the address to invalidate. The command can be structured as a variant of the INVALIDATE IOMMU PAGES command, or the command can be structured as a new command.

In another embodiment, invalidation can be accomplished by issuing a prefetch immediate command. The prefetch immediate command can specify an occupied address translation slot, and specify that the information contained in the occupied address translation slot should be overwritten. For example, the prefetch immediate command can contain an invalidation bit. When the invalidation bit is indicated, the IOMMU is directed to obey the prefetch immediate command and overwrite pre-existing address translation information. Thus, the invalidation bit can control whether the IOMMU can selectively ignore the prefetch immediate command.

In yet another embodiment, where the IOTLB structure is exposed directly in, for example, MMIO space where system software can directly manipulate the contents, invalidation can be accomplished by using a direct-access method. In this embodiment, system software can invalidate entries the same way it inserts them into the table—by manipulating the IOTLB through MMIO space.

Although the system software running, for example, on the main x86 processor is augmented by these new commands, the benefits introduced can be implemented in software that is easily changed to implement the benefits. The system software is able to implement more sophisticated, appropriate, adaptable, and efficient replacement techniques than unmodified hardware mechanisms can anticipate or implement at a local level. For some system constraints, typically systems that are performance sensitive, a full IOMMU with a hardware page-table walker can be implemented to complement the software commands and associated structure described herein.

Figure 11:
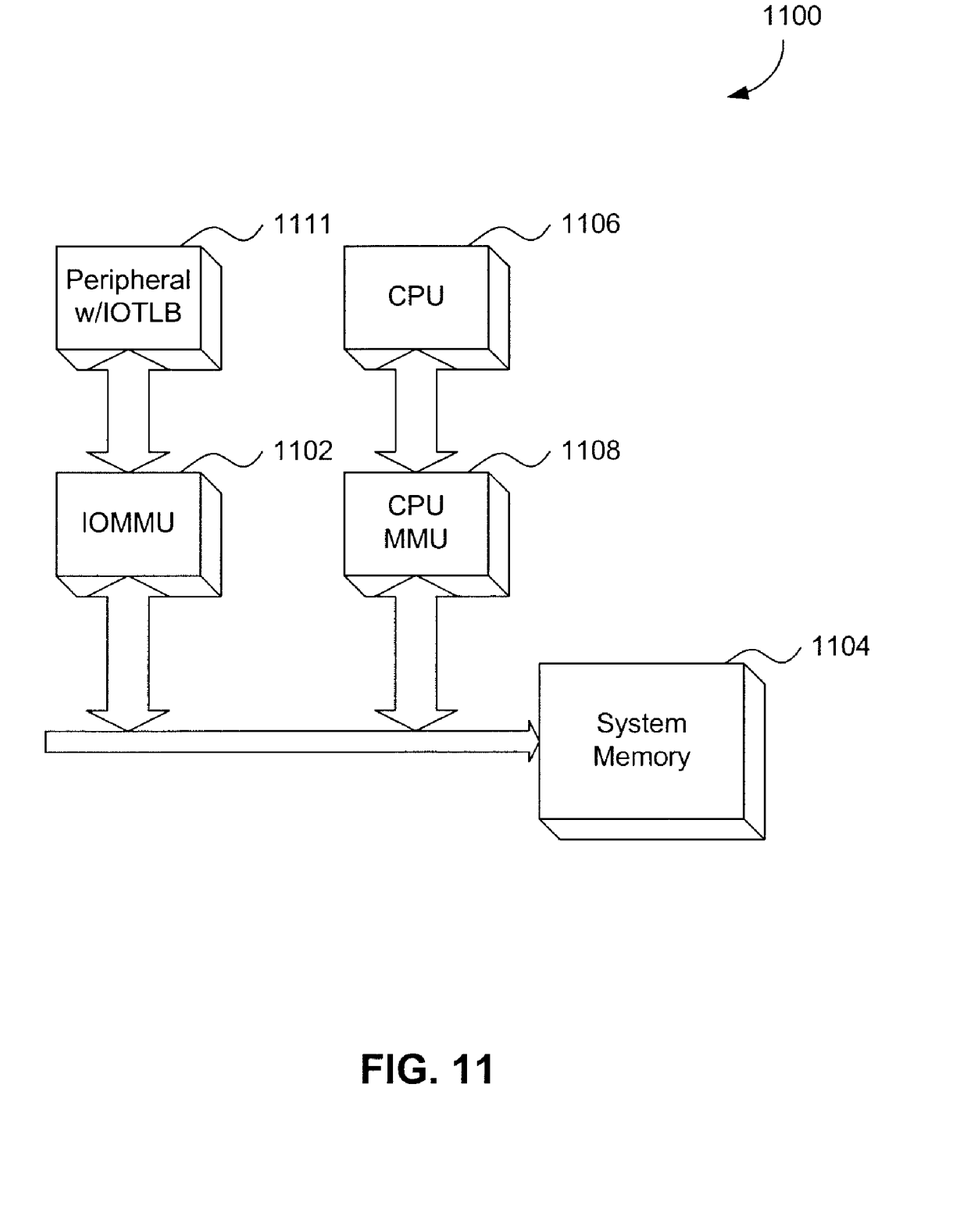
FIG. 11 is a block diagram illustrating a system including an IOMMU and a peripheral with an IOTLB in accordance with yet another embodiment.

FIG. 11 is a block diagram illustration of a system 1100 including an IOMMU 1102 and a peripheral 1111 with an IOTLB. System 1100 includes system memory 1104, CPU 1106, and CPU MMU 1108. Some peripherals will use an IOTLB within the peripheral. The IOTLB of the peripheral can function as a logical extension of the IOTLB of the IOMMU 1102. A peripheral with an IOTLB 1111 can utilize an IOMMU 1102 to perform page-table walks to obtain and return the translation information (e.g., PCI-SIG ATS Address Translation Services). The prefetch immediate command and other associated commands and structures described herein are therefore compatible with such systems including a peripheral with an IOTLB 1111.

Peripherals with an IOTLB 1111 in such systems can continue to use the PCI-SIG ATS protocol to populate their IOTLB. The peripherals with an IOTLB in such a system can also adopt embodiments described herein to populate their IOTLB. System software can populate both the IOMMU and the IOTLB of the peripheral, and the protocols and software interface can be compatible for efficiency. In an embodiment, the IOMMU would not need to support the ATS protocol, simplifying the design and reducing the silicon area and power requirements.

Figure 12:
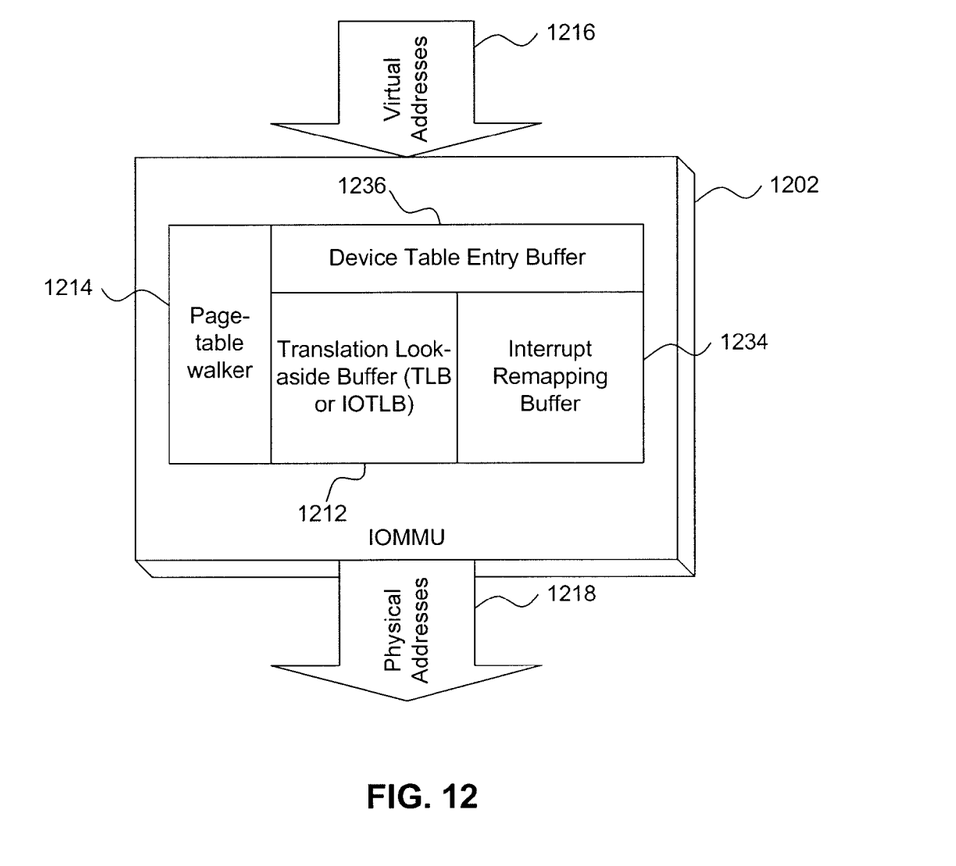
FIG. 12 is a block diagram illustrating an IOMMU including an interrupt remapping buffer and a device table entry buffer in accordance with yet another embodiment.

FIG. 12 is a block diagram illustration of a further embodiment of an IOMMU 1202 including an IOTLB 1212, a page-table walker 1214, an interrupt remapping buffer 1234, and a device table entry buffer 1236. The IOMMU 1202 provides a feature called Interrupt Remapping that functions similarly to address translation in translating between virtual addresses 1216 and physical addresses 1218, but applies to interrupts. The techniques and embodiments described herein can therefore be used for Interrupt Remapping. New commands or variants of existing commands can be implemented to carry interrupt remapping information, instead of address translation. Similarly, new or variant commands can be implemented for invalidation of interrupt remapping information. The address translation and interrupt remapping can be implemented independently, because the corresponding tables are separate and independent, correlated by the IOMMU Device Table Entry Buffer 1236. Accordingly, IOMMU 1202 can perform enhanced address translation and interrupt remapping.

CONCLUSION

Embodiments described herein can improve time-to-market for an IOMMU implementation (product), reduce the effort required to develop, test, and support new IOMMU hardware, and provide a mechanism that allows software to make globally optimal policy decisions to improve upon locally optimal policy decisions made by hardware, where applicable. Embodiments also allows for a software-managed "quick path" translation feature utilizing side TLBs. The function of an IO memory management unit can be implemented more efficiently (less silicon area), and IO can flow faster through such a system. Multiple IOMMUs, with and without the proposed enhancements, can coexist in a system for compatibility reasons—older and newer chip designs can be intermixed in system designs. Because some embodiments do not require page-walker hardware, the resulting IOMMU can be smaller and fit on smaller FPGAs. Because embodiments do not require the IOMMU to hard-wire the format of specific page tables, embodiments can work with a variety of page table formats (e.g., with non-x86 processors and formats).

What is claimed is:

1. A method comprising:
   storing a first set of address translation information at a first cache located within a memory management unit;
   selectively storing a second set of address translation information at a second cache located within the memory management unit, wherein the second set of address translation information is accessed more frequently than the first set of address translation information and the second cache is not subject to an eviction operation performed on the first cache.

2. The method of claim 1, wherein the first set of address translation information, the second set of address translation information, or both is included in a prefetch immediate command.

3. The method of claim 1, wherein the first set of address translation information, the second set of address translation information, or both includes a virtual address and a translated physical address associated with the virtual address.

4. The method of claim 1, wherein the memory management unit is an input/output (I/O) memory management unit (IOMMU).

5. The method of claim 1, wherein the first cache is a side translation look-aside buffer (TLB) and the second cache is an I/O translation look-aside buffer (IOTLB).

6. The method of claim 1, further comprising:
   creating an event log entry responsive to a request for address translation information associated with the first set of address translation information, the second set of address translation information, or both not stored in the first cache or the second cache; and
   inserting the requested address translation information into the first cache or the second cache responsive to the event log entry.

7. The method of claim 1, further comprising:
   performing a page-table walk, using a page-table walker associated with the memory management unit, responsive to a request for address translation information associated with the first set of address translation information, the second set of address translation information, or both not stored in the first cache or the second cache;
   obtaining, using the page-table walker, the requested address translation information from a translation table in a system memory of a computer system in communication with the memory management unit; and
   inserting the requested address translation information into the first cache, the second cache, or both using a cache replacement mechanism associated with the memory management unit.

8. The method of claim 1, further comprising:
   inserting the first set of address translation information, the second set of address translation information, or both into one or more specified slots associated with the first cache, the second cache, or both, thereby bypassing a cache replacement mechanism associated with the memory management unit.

9. The method of claim 1, further comprising:
   invalidating one or more locations associated with the first cache, the second cache, or both using an invalidation mechanism associated with the memory management unit, wherein the invalidating is responsive to an invalidation command specifying at least one of one or more address entries, one or more slots, or a combination thereof.

10. The method of claim 1, further comprising:
    storing the first set of address translation information, the second set of address translation information, or both responsive to an invalidation indication, regardless of any already stored address translation information associated with the first set of address translation information, the second set of address translation information or both.

11. The method of claim 1, further comprising:
    determining a resource status of a computer system including the memory management unit; and
    selectively storing, based on at least the resource status, interrupt remapping information at an interrupt remapping buffer associated with the memory management unit.

12. The method of claim 1, wherein the storing the first set of address translation information comprises updating a first set of translation entries corresponding to the first set of address information more frequently than a second set of translation entries corresponding to the second set of address information.

13. A system comprising:
    a central processing unit;
    a system memory unit in communication with the central processing unit; and
    a memory management unit in communication with the system memory unit and configured to:
    store a first set of address translation information at a first cache located within the memory management unit;
    selectively store a second set of address translation information at a second cache located within the memory management unit, wherein the second set of address translation information is accessed more frequently than the first set of address translation information and the second cache is not subject to an eviction operation performed on the first cache.

14. The system of claim 13, wherein the first set of address translation information, the second set of address translation information, or both is included in a prefetch immediate command.

15. The system of claim 13, wherein the first set of address translation information, the second set of address translation information, or both includes a virtual address and a translated physical address associated with the virtual address.

16. The system of claim 13, wherein the memory management unit is an input/output (I/O) memory management unit (IOMMU).

17. The system of claim 13, wherein the first cache is a side translation look-aside buffer (TLB) and the second cache is an I/O translation look-aside buffer (IOTLB).

18. The system of claim 13, wherein the memory management unit is further configured to:
create an event log entry responsive to a request for address translation information associated with the first set of address translation, the second set of address translation information, or both not stored in the first cache or the second cache, respectively; and
insert the requested address translation information into the first cache or the second cache responsive to the event log entry.

19. The system of claim 13, wherein the memory management unit is configured to:
perform a page-table walk, using a page-table walker associated with the memory management unit, responsive to a request for address translation information associated with the first set of address translation information, the second set of address translation information, or both not stored in the first cache or the second cache;
obtain, using the page-table walker, the requested address translation information from a translation table in the system memory unit; and
insert the requested address translation information into the first cache, the second cache, or both using a cache replacement mechanism associated with the memory management unit.

20. The system of claim 13, wherein the memory management unit is configured to insert the first set of address translation information, the second set of address translation information, or both into one or more specified slots associated with the first cache, the second cache, or both, thereby bypassing a cache replacement mechanism associated with the memory management unit.

21. The system of claim 13, wherein the memory management unit is configured to invalidate one or more locations associated with the first cache, the second cache, or both using an invalidation mechanism associated with the memory management unit, wherein the invalidation mechanism is responsive to an invalidation command specifying at least one of one or more address entries, one or more slots, or a combination thereof.

22. The system of claim 13, wherein the memory management unit is configured to store the first set of address translation information, the second set of address translation information, or both responsive to an invalidation indication, regardless of any already stored address translation information associated with the first set of address translation information, the second set of address translation information, or both.

23. The system of claim 13, further comprising:
an interrupt remapping buffer associated with the memory management unit and configured to selectively store, based on at least a resource status, interrupt remapping information.

24. A tangible computer-readable medium having stored thereon, computer-executable instructions that, if executed by a computing device, cause the computing device to perform a method comprising:
storing a first set of address translation information at a first cache located within a memory management unit;
selectively storing a second set of address translation information at a second cache located within the memory management unit, wherein the second set of address translation information is accessed more frequently than the first set of address translation information and the second cache is not subject to an eviction operation performed on the first cache.

* * * * *